No. 702,029. Patented June 10, 1902.
T. P. PAYNE.
APPARATUS FOR UNLOADING SCOWS, &c.
(Application filed June 27, 1901.)
(No Model.) 3 Sheets—Sheet 2.
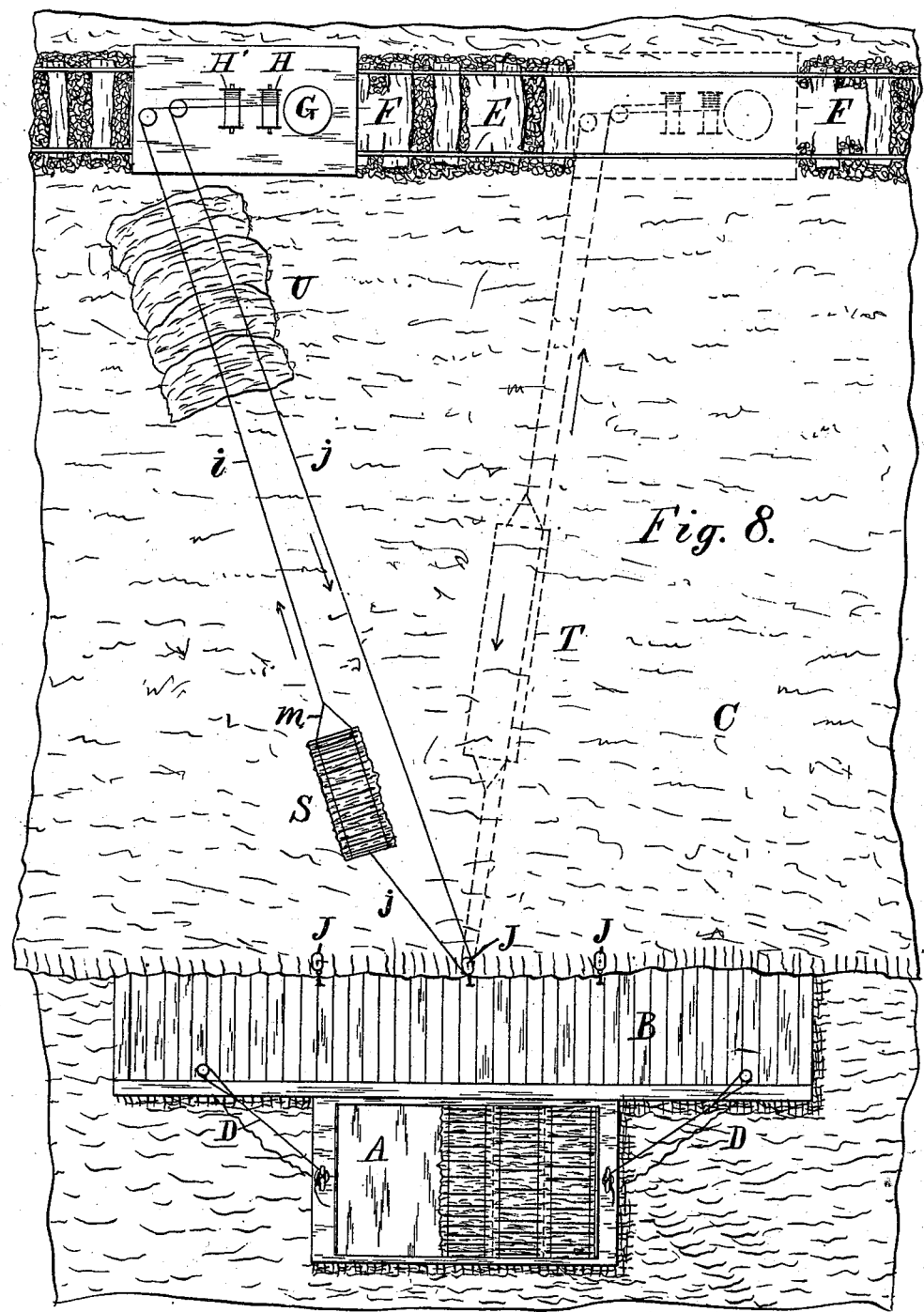

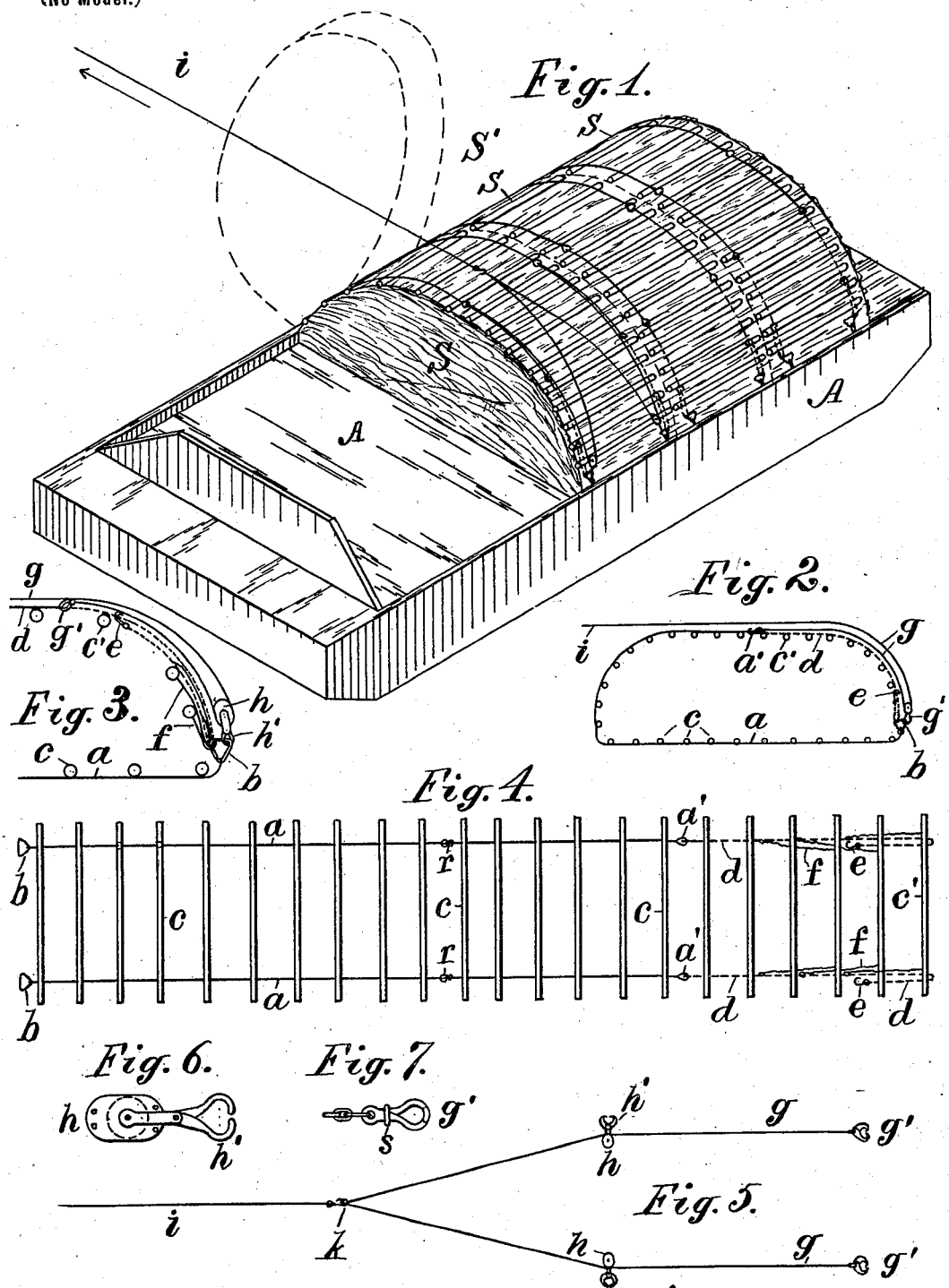

No. 702,029. Patented June 10, 1902.
T. P. PAYNE.
APPARATUS FOR UNLOADING SCOWS, &c.
(Application filed June 27, 1901.)
(No Model.) 3 Sheets—Sheet 3.
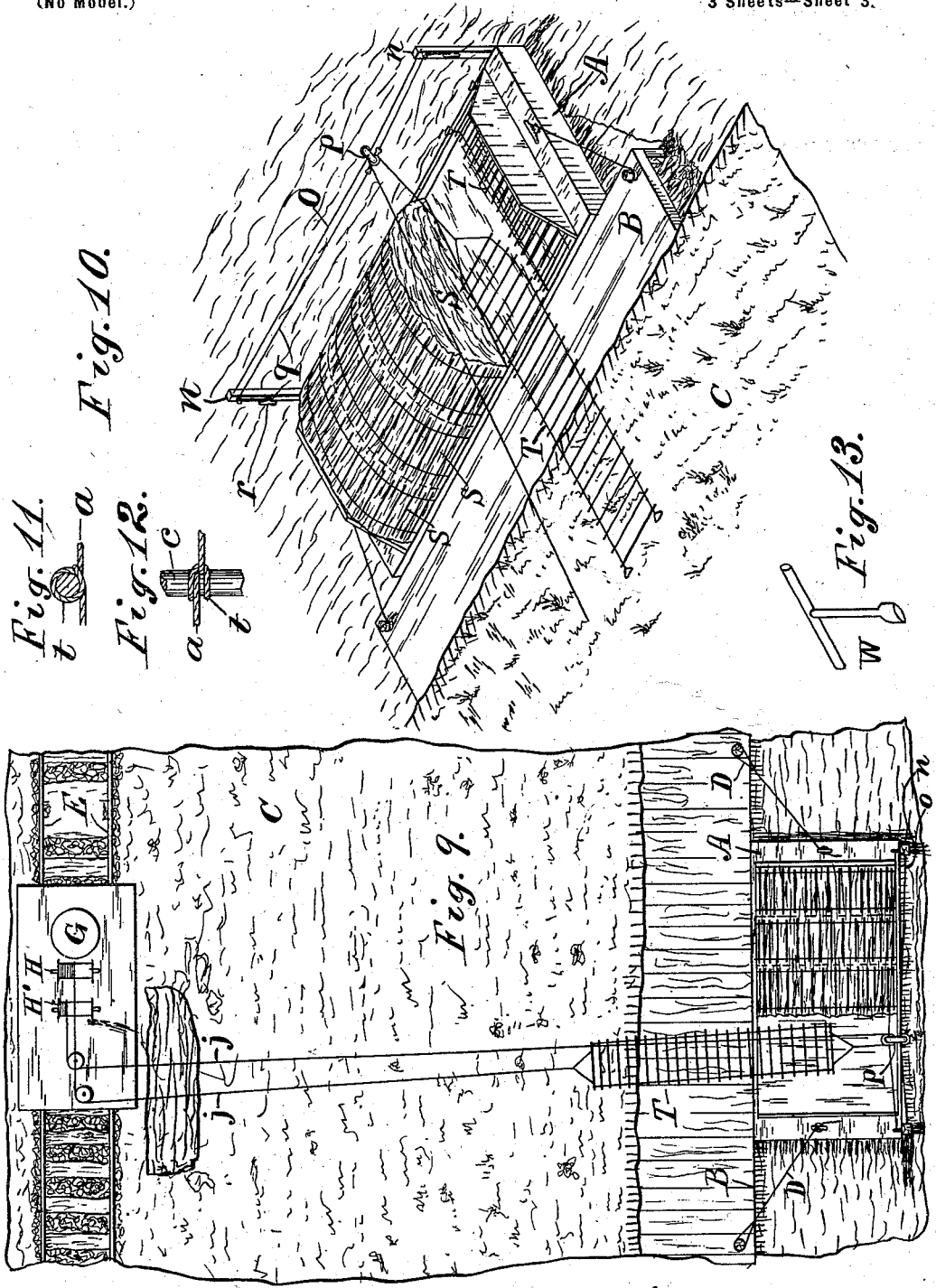

UNITED STATES PATENT OFFICE.

THEODORE P. PAYNE, OF IRVINGTON, NEW JERSEY.

APPARATUS FOR UNLOADING SCOWS, &c.

SPECIFICATION forming part of Letters Patent No. 702,029, dated June 10, 1902.

Application filed June 27, 1901. Serial No. 66,237. (No model.)

*To all whom it may concern:*

Be it known that I, THEODORE P. PAYNE, a citizen of the United States, residing at Springfield avenue, Irvington, county of Essex, State of New Jersey, have invented certain new and useful Improvements in Apparatus for Unloading Scows and Similar Receptacles, fully described and represented in the following specification and the accompanying drawings, forming a part of the same.

The object of the present invention is to furnish a convenient means of unloading from scows and similar receptacles such materials as paper and waste articles of a manufactured character, such as can be clamped and held together in a bale by suitable baling devices. Such rubbish can be transported on scows from cities where it accumulates to low grounds which require filling and can be utilized to raise the level of such grounds; and the present invention furnishes a series of baling devices which can be arranged transversely upon the floor of the scow before it is loaded, so as to provide means to clamp the contiguous sections of the load together in bale form and tear them from one another by means of a tightening-tackle attached to a draft-rope, which serves also to overturn the load-section and drag it off of the scow to the desired point upon the ground.

The invention will be understood by reference to the annexed drawings, in which—

Figure 1 is a perspective view of a scow with several sections of its load provided with the baling device. Fig. 2 is a diagram showing the operation of the baling device. Fig. 3 is a part of such diagram showing the loose connections of the chain with certain of the cross-bars when the bale is tightened. Fig. 4 shows the baling device extended. Fig. 5 is a plan of the tightening-tackle for the baling device. Fig. 6 is an illustration of one of the tightener-pulleys. Fig. 7 is an illustration of one of the sister-hooks upon the tightening-tackle. Fig. 8 is a diagram showing the means for baling and unloading the material from a scow and hauling the baling devices back to the dock. Fig. 9 is a similar view showing tackle for hauling the baling device back to the scow, and Fig. 10 is a perspective view of the scow provided with such tackle. Fig. 11 is an end view, and Fig. 12 a bottom view, of one of the rope connections with cross-bar $c$, and Fig. 13 is a perspective view of the sister-hook wrench.

A designates the scow, B a dock adjacent to low ground C which is to be filled, and D the hawsers which secure the scow to the dock. A track E is shown parallel with the dock and may be arranged hundreds of feet back from the scow to distribute its load upon the intervening ground.

In full lines a car F is shown upon the track, provided with steam-boiler G and hauling-drums H and H', which would be rotated by suitable engines, as is common. At the opposite end of the track the car and fixtures are shown in dotted lines. In Fig. 8 a snatch-block J is shown upon the wharf, and a draft-rope $i$ is shown extended from the drum H toward the scow and attached to one of the load-sections, (designated S.) A return-rope $j$ is shown carried through the snatch-block J and attached to the baling device upon the section S to haul such baling device back to the scow when detached from the bale. The draft-rope is shown in dotted lines thus operating upon one of the baling devices, (lettered T in the same figure.)

The baling devices (shown in Figs. 1 to 7) include a pair of rope ties $a$, furnished at one end with rings $b\ b$ and provided with cross-bars $c$, the ties having at the opposite end extensions formed of chains $d$, provided at their ends with hooks $e$, adapted to engage the links of the chain at any point. When applied to the bale, the ends of the chain $d$ are looped through the rings $b$ and the hooks $e$ engaged with the chain, as shown in Figs. 2 and 3. Cross-bars $c'$ are attached finally to the chains near their connection with the ropes $a$, and near the free ends of the chains other cross-bars are attached by connecting-cords $f$, which when extended in one direction, as shown in Fig. 4, serve to adjust the cross-bars, but when extended in the opposite direction throw the cross-bars back upon the chains, so that the chains and cords can be drawn through the rings during the tightening of the bale.

The baling devices are shown of suitable size to embrace one-fifth the load upon the scow and are in practice laid transversely upon the bottom of the scow, with the rings $b$ at the nearer side of the scow (shown in Fig. 1) and the portion extending from $r$ to $e$, Fig. 4, being extended over the top of the load to the side farthest from the dock, so that the chains can be looped through the rings and the ends $e$ hooked fast, as in Fig. 1.

The tightening-tackle (shown in Fig. 5) comprises the ropes $g$, provided at the ends with sister-hooks $g'$ to engage the eyes or rings $a'a'$ at the base of each chain and with the pulley-block $h$, (shown also in Fig. 6,) provided with sister-hooks $h$ to engage the ring $b$. The ropes are extended through a ring or block $k$, to which the draft-rope $i$ may be hooked. The pull upon the draft-rope, as shown by the arrow $l$ in Fig. 1, serves first to draw the ends of the baling device together, which pulls some of the cords $f$ through the rings $b$ and slackens the chains $d$, so that their hooks $e$ may be shifted farther up on the chains, as in Fig. 3.

When the bale is fully tightened and the hooks $e$ secured, the continued pull upon the draft-rope overturns the bale by tearing one section of the load from the remainder, as indicated by the dotted lines $S'$ in Fig. 1, and thus discharges it from the scow upon the dock. If preferred, the tightening-tackle may be removed and the forked sling or yoke-chain $m$ (shown in Fig. 8) used to connect the draft-rope with the rings $b$ upon the bale, in either case the adjustment of the car F upon the track E and the pull of the draft-rope serving to draw the bale to any desired point upon the ground. Before the bale is drawn from the dock the return-rope $j$, which is carried around the return-pulley or snatch block J, is hooked to the opposite end of the bale and is carried therewith, so that it may be used to draw the baling device back to the dock when the contents of the bale are distributed.

The contents of four of the bales is shown at U in Fig. 8 deposited in the line of the draft-rope $i$, and when a given line is thus fully covered with the material the car is moved upon the track to draw the bales in another direction, and the whole surface of the ground may thus be covered.

A number of the snatch-blocks J are shown upon the dock to permit various dispositions of the return-rope $j$.

To facilitate the return of the baling devices to the scow, I prefer to construct the scow, as shown in Figs. 9 and 10, with posts $n$ upon the outer side, between which a cable $o$ is extended, and a pulley-carrier $p$, mounted upon the cable and adjusted at any point in the length of the cable by the ropes $q$, fastened to cleats $r$. The return-rope is shown in Fig. 10 extended through the pulley upon the carrier $p$, and one of the baling devices is shown hauled partly upon the scow by the operation of the rope, and one is shown upon the adjacent unloaded space where deposited by the carrier.

Each section S of the load is shown in the drawings provided with the baling device; but it will be understood that only the bottom portion of the baling device, embracing a part of the ties $a$ and cross-bars $c$, (the left half of the device shown in Fig. 4,) needs to be placed on the deck of the scow before it is loaded and that the remainder of the baling device, extending from $r$ to $e$, as shown in Fig. 4, and comprising the rest of the ties $a$ and the chain ties $d$, need be applied to the top of each section only when it is desired to bale and unload such section. With such a use of the baling device it would be divided at the middle of its length by ring and hooks $r$, sister-hooks being employed for the purpose like that shown in Figs. 6 and 7.

The shanks of the sister-hooks may be provided with an elastic, as shown at $s$ in Fig. 7, to hold the jaws of the hook normally closed, and thus prevent their being loosened by accident.

In using the baling device in this way only two of the parts would actually be required which are provided with the chain ties $d$, one of such parts being applied to a bale to drag the same from the scow and the other being adjusted in place upon the adjacent load-section S in readiness to be removed when the first has been returned, and the first being then adjusted upon one of the load-sections, while the other is used to remove a bale. The expense of the outfit may be thus considerably reduced.

By reference to Figs. 2 and 3 it will be observed that the cross-bars $c$ and $c'$ lie upon the inside of the ties $a$ and $d$, and the ties may be thus located by forming two half-hitches $t$ of the rope around each of the ties, as shown in Figs. 11 and 12, thus leaving the exterior of the bale smooth where it is dragged over the ground. The so-called "rings" $b$ at the ends of the ties $a$ are shown of triangular form, as each of them is intended to engage three different elements—namely, the tie $a$, the chain $d$, and at first the sister-hooks $h'$ and afterward similar hooks on the yoke-chain $m$. Rings of circular or any other form may be used, if preferred.

It will be understood that the ties are formed with the chain portion at one end to facilitate the engagement of the hooks $e$ with any point upon the tie to which the hook can be drawn when the chain is slackened by the baling pressure. Such pressure is very considerable, owing to the attachment of the tightening-tackle to that side of the bale which is farthest from the dock, so that the pressure which is involved in tearing the bale loose from the other load-sections operates first to tighten the bale before overturning it.

The attachment of the tightening-ropes $g$ to the top of the bale and their extension through the pulleys at the lower rear corner of the bale causes it to hold all the crosspieces c' in place irrespective of the ties d, thus leaving the chains entirely slack during the tightening of the bale to be drawn through the rings b and secured by the hooks e.

To unlock the bale for distribution while the ties are under tension, a wrench W, with a cross-handle and a T-head, as shown in Fig. 13, may be used for opening the sister-hooks r when the bale has been dragged to a suitable point for distributing its contents upon the ground, the continued pull of the draft-rope i then serving to turn the contents of the bale over in a pile upon the matter previously dumped. By this method of dumping each bale the labor of distributing the material is greatly diminished.

Where it is desired to drag the contents of one bale upon the top of the previously-formed pile, the bale is dragged by attachment to the rings r, (shown in Figs. 2 and 4,) which leaves the hooks e at the rear of the bale. When the bale is drawn near to the pile, the hooks e are unlocked by means of the wrench W, and the chains d are drawn out of the rings b. The draft-rope is then carried over the top of the pile, as shown in Fig. 2, and connected by the rings b by yoke-chains, and a renewed pull upon the draft-rope then overturns the bale upon the top of the pile and scatters its contents fully while drawing the baling device from beneath the contents of the bale. Where a piece of ground has been entirely filled with such material, it may be afterward leveled by chaining a bundle of telegraph-poles or other logs together and drawing them back and forth over the surface by the same means that have been described for drawing the bale and the baling device back and forth. It will be fully understood that the precise construction of the baling device is not material, as the ties may be formed wholly of chains instead of forming them partly of ropes; but the ropes possess the advantage of securing the cross-bars c without any additional fixtures by means of the half-hitches. (Shown in Figs. 11 and 12.)

Where it is desirable to use the baling device for hauling material which would fall out between the cross-bars, the surface of the bars may be covered with canvas or a net of suitable fineness, and as the cross-bars then protect the net from wear I have made a special claim to the combination of such net and bars.

Having thus set forth the nature of the invention, what is claimed herein is—

1. The baling device consisting of the bale-ties a having the rings b at one end and the cross-bars c as set forth, and the chain ties d having cross-bars and adapted to loop through the rings, and provided with hooks e to engage the chain-links to secure the bale.

2. The baling device consisting of the bale-ties a having the rings b at one end and the cross-bars c as set forth, the chain ties d having cross-bars c' secured thereto by loose connections f, and the chain ties being adapted to loop through the rings b and provided with suitable fasteners to engage the chain when the bale is tightened.

3. The baling and unloading device, consisting of the bale-ties provided with cross-bars, and one end of such ties being adapted to loop through the other end as set forth, in combination, with the tightening-tackle comprising the ropes g attached to one section of the bale-ties, the pulleys h attached to the other section of the bale-ties, and a draft-rope i for hauling the tightening-tackle and drawing the tie-sections together, and operated as set forth to invert the bale and roll it from its support.

4. The means for unloading scows and similar receptacles, comprising a series of baling devices arranged transversely upon the floor of the scow to support transverse sections of its load, and a draft-rope and tackle for successively tightening the baling device upon each of such load-sections, and rolling over the same to tear it from the remainder of the load and discharge it from the scow.

5. The means for unloading scows and filling in low grounds adjacent to water, comprising the dock for mooring the scow, a track upon the ground with power-drum mounted movably thereon, and draft-rope extended to the scow, and baling devices arranged upon the scow under sections of the load, with tightening-tackle actuated by the draft-rope to tear the load-sections from the scow and deposit them upon the ground at the desired point.

6. The means for unloading scows and filling in low ground adjacent to water, comprising the dock for mooring the scow, baling devices arranged transversely upon the scow under sections of the load with tightening-tackle for tightening and overturning such load-sections, posts upon the outer side of the scow with cable and pulley carrier thereon, and means for shifting the carrier upon the cable, a track with two drums mounted movably thereon, and return-rope and draft-rope extended respectively from the said drums to the carrier-pulley and a bale upon the scow, a connection from the draft-rope to the bale or load-section to draw it upon the ground, and a connection from the return-rope to the baling device to return it from the scow when unloaded, substantially as herein set forth.

7. The means for unloading scows and filling in low grounds adjacent to water, comprising the dock for mooring the scow, means upon the ground for hauling a draft-rope, a baling device arranged transversely upon the deck of the scow under a section of the load, and provided upon the side of the scow farthest from the dock with rings b as set forth, a portion of the baling device extended over the top of the bale and looped through such rings to lock up the bale when tightened, tightening-tackle connected with the draft-rope for tightening up the bale and overturning the load-section to tear it from the remainder of the load.

8. The two-part baling device consisting of the bale-ties $a$ having the rings $b$ at one end and the cross-bars $c$ as set forth, and adapted to extend across the deck of a scow, and the bale-ties provided with cross-bars $c'$ and having the chain portions $d$ and hooks $e$, and adapted for connection at one end with the ties $a$ and at the other end to have the chains looped through the rings $b$ and secured by hooks $e$, as and for the purpose set forth.

9. The two-part baling device consisting of the bale-ties $a$ having the rings $b$ at one end and the cross-bars $c$ as set forth, and adapted to extend across the deck of a scow, and the bale-ties provided with cross-bars $c'$ and having the chain portions $d$ and hooks $e$, and the two parts of the baling device being united by the sister-hooks $r$ having an elastic upon their shank to hold them normally closed, as and for the purpose set forth.

10. The baling device having bale-ties $a$ formed of rope with rings $b$ at one end and provided at intervals with half-hitches and the cross-bars $c$ secured in the half-hitches as set forth, and chain ties attached to the bale-ties and provided with the hooks $e$ and adapted to loop through the rings $b$, as and for the purpose set forth.

In testimony whereof I have hereunto set my hand in the presence of two subscribing witnesses.

THEODORE P. PAYNE.

Witnesses:
RALPH W. PAYNE,
THOMAS S. CRANE.